United States Patent [19]

Crawford, Jr.

[11] 3,949,126
[45] Apr. 6, 1976

[54] MULTIFILAMENT COMPOSITES

[75] Inventor: James A. Crawford, Jr., Portland, Maine

[73] Assignee: Fiber Materials, Inc., Biddeford, Maine

[22] Filed: June 17, 1974

[21] Appl. No.: 479,868

[52] U.S. Cl. ............... 428/113; 428/223; 428/297; 428/304; 156/92
[51] Int. Cl.² ......................................... B32B 5/12
[58] Field of Search ............ 161/50, 53, 55, 84, 85, 161/140; 156/91, 92, 253, 303.1; 428/101, 105, 112, 113, 114, 223, 297, 304, 317

[56] References Cited
UNITED STATES PATENTS

| | | | |
|---|---|---|---|
| 2,819,994 | 1/1958 | Gregory | 161/140 |
| 3,142,610 | 7/1964 | Lowe | 156/92 |
| 3,230,995 | 1/1966 | Shannon | 161/55 |
| 3,837,985 | 9/1974 | Chase | 161/55 |

Primary Examiner—George F. Lesmes
Assistant Examiner—William R. Dixon, Jr.
Attorney, Agent, or Firm—Schiller & Pandiscio

[57] ABSTRACT

A composite structure having isotropic strength properties and comprising a three-dimensional network of reinforcing yarns embedded in a body. The yarns are arranged in a plurality of groups, each group comprising a plurality of yarns arranged parallel with one another. The yarns of at least three of the groups are arranged so that the yarns of each of the three are directed in a mutually orthogonal direction with respect to the other two. At least one other group (or groups of yarns) is directed diagonally to the yarns of at least two of the three mutually orthogonal groups.

13 Claims, 6 Drawing Figures

MULTIFILAMENT COMPOSITES

The present invention relates to reinforcing structures and particularly to fiber reinforced composite materials designed for use in applications requiring substantiallly isotropic strength and stability.

It is generally known that certain materials, especially felts which are generally of relatively low density, are structurally weak and cannot be employed where strength and rigidity are required as when subjected to tensile or compressive forces. Because of their low density, many of these materials have found utility in a wide range of applications including, for example, as accoustical and/or thermal insulation, a light weight filler within other more rigid structures and in a variety of chemical and/or thermal applications in which the material may be employed as a catalyst bed or as an aid in heat transfer. Accordingly, it is desirable to reinforce these materials to improve their strength, rigidity and integrity.

Various approaches have been made to the problem of reinforcing these materials. These include the use of yarn or filamentary structures integrated with the material. Linear yarns arranged in generally parallel relation have been employed to provide unidirectional or single dimensional stability, while bidirectional or two-dimensional added strength is achieved by interlocking two sets of unidirectional reinforcing yarns oriented in two directions such as by employing woven and/or knitted fabrics embedded within and/or secured to the outside of layers of material. The latter type of reinforced materials are isotropic in only two directions. In order to achieve three dimensional isotropy, the present state of the art utilizes a yarn structure in which linear yarns are arranged in mutually orthogonal directions by disposing the yarns mutually perpendicular to one another.

Prior art structures or skeletons of three-dimensionally woven yarns have been employed to form composites by chemical vapor deposition processes. In the latter type of process, a gaseous chemical compound including an element such as carbon, boron, etc., is brought into contact with a heated surface, specifically, the surface of a yarn which is a component of a three-dimensionally woven body. Heat is transferred from the heated surface to the chemical compound causing it to decompose, releasing the various solid and gaseous constituents. The solid constituent element of the decomposed gaseous compound is released as a vapor which condenses as a solid on the cooled surface of a yarn to form a composite having a three-dimensional skeleton. As an example of such a process mention is made of the formation of pyrolytic graphite in which a body formed of woven or interlocked yarns is heated in the absence of oxygen to approximately 2000°F. Methane is introduced into the heated woven body where it is broken down into hydrogen and elemental carbon, the latter being deposited on the surfaces of the yarns comprising the body. The same or similar materials and structures formed by such chemical vapor deposition applications have utility in applications such as in high temperature, nonablating thermal protection in which the composite material, improved by virtue of the reinforcing filaments, may be subjected to tension, compression and/or bending stresses as well as other conditions tending to induce structural failure such as vibration, cyclic stressing and the like.

Such simple three-dimensional woven skeletons however, are not always adequate to reinforce materials which are subject to extreme ablative conditions, wherein high strength and low erosion rates at high temperatures are needed. It has been found that the greater the number of fiber ends exposed on a composite surface, the better its performance will be under high temperature conditions.

The present invention therefore, is particularly concerned with the renforcement of materials to provide composite materials having more uniform strength properties than the composite materials of the prior art. The reinforcement is provided by a multi-dimensional network of reinforcing yarns. The yarns are essentially arranged in a plurality of groups, each group comprising a plurality of yarns arranged parallel with one another. The yarns of at least three of the groups are arranged so that the yarns of each of the three are directed in a mutually orthogonal direction with respect to the other two. The remaining group or groups of reinforcing yarns are directed diagonally to the yarns (i.e. at an angle other than 90°) of at least two of the three mutually orthogonal groups. Two disclosed embodiments of the invention utilize a seven directional reinforcement structure (hereinafter referred to as 7-D) the seven directions being determined by one of two methods. Another embodiment of the invention utilizes an eleven directional reinforcing structure (hereinafter referred to as 11-D).

Accordingly, an object of the present invention is to provide novel filament reinforcing structures which overcome the aforementioned problems described above.

Another object of the present invention is to provide a reinforcing structure having improved structural properties including more uniform resistance to deformation, integrity and isotropic strength in multiple directions.

Yet another object of the present invention is to provide an improved composite material having an improved reinforcing structure which has high uniform strength and low erosion rates at high temperatures.

Other objects of the invention will, in part, be obvious and will, in part, appear hereinafter.

The invention accordingly comprises the product possessing the features, properties and the relation of components which are exemplified in the following detailed disclosure and the scope of the application of which will be indicated in the claims.

For a fuller understanding of the nature and objects of the invention, reference should be made to the following detailed description taken in connection with the accompanying drawings wherein.

The present invention is directed to reinforced structures or composite bodies formed of woven yarn in a matrix of another material. The material of which the matrix is constituted may be any material which can be reinforced such as nonporous solids such as graphites, metals, ceramics, and alloys such as cermets, porous materials such as felts and the like, etc. The yarns may be monofilaments or comprise a plurality of tow or stranded or unstranded filament material. The yarn material may be any material capable of being produced in fiber form. Typical yarns used are produced from carbon, graphite, quartz and stainless steel. Generally, high packing densities are essential to achieve high final composite strength and stiffness.

Figure 1:
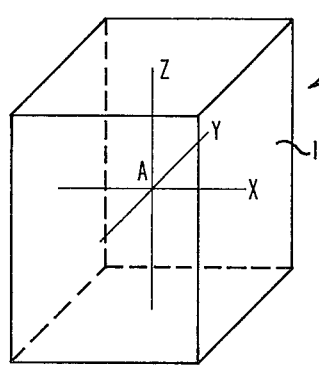
FIG. 1 is a perspective view of a geometric representation of a unit cell of a reinforcing structure of the prior art.

Referring to the drawings, wherein like characters refer to like parts, FIG. 1 shows a geometrical representation of a composite body preform 10, only a unit cell of which is shown in the form of a rectangular block of matrix material 12 in which is distributed a reinforcing structure of the three directional (3-D) type, the latter being well known in the art. The actual composite is formed of a plurality of similar such cells. The reinforcing structure, although not shown in detail for clarity in exposition, consists of three groups of yarns which are interwoven. The yarns of each group are woven essentially in the same direction with respect to one another and in a direction which is mutually orthogonal with respect to the direction of the yarns or the other two groups. The three mutually orthogonal directions of the groups of yarns can be represented by a three-dimensional Cartesian Coordinate System having X, Y and Z axes intersecting at point A. As shown, the three axes are oriented to be either parallel with or normal to the faces of preform 10 inasmuch as in most instances the greatest reinforcement can be achieved by such orientation of the directions of the three groups of yarns.

As mentioned above, however, the 3-D preform is not always adequate to reinforce a matrix of materials which are subject to extreme ablative conditions. This is especially true when the composite body is of a shape other than a block. It has been found that the greater the number of fiber ends exposed on the composite surface, the better the ablative performance of the latter will be under high temperature conditions.

The present invention therefore is concerned, inter alia, with increasing the number of fiber ends exposed on the composite surface. The resulting structure also has more isotropic strength properties. Composite bodies, formed of a plurality of unit cells such as shown, and reinforced in accordance with the invention, may include various geometric forms such as blocks, cylinders, plates, frusta and the like, required to be self-supporting and/or withstand one or a combination of compression, tension and bending forces.

Figure 2:
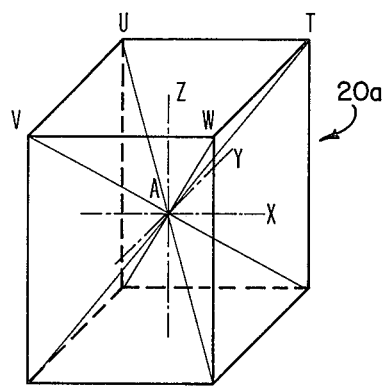
FIG. 2 is a perspective view of a geometric representation of one embodiment of a unit cell made in accordance with the teachings of the invention.
Figure 3:
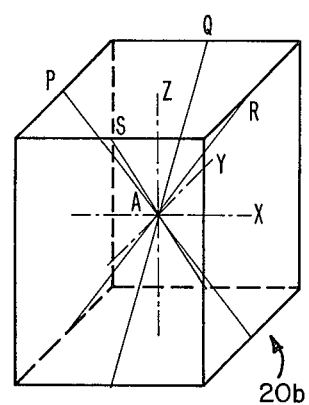
FIG. 3 is a perspective view of a geometric representation of another embodiment of a unit cell made in accordance with the teachings of the invention.

A geometrical representation of two embodiments of unit cells of the improved composite structures is shown in FIGS. 2 and 3. The unit cell of composite body preform 20 shown generally as a rectangular block, includes a reinforcing structure termed herein the 7-D type. The actual reinforcing structure, although for clarity in exposition is not shown in detail in FIGS. 2 and 3, comprise seven groups of yarns which are interwoven together. The yarns of each group are woven essentially in the same direction with respect to one another. Three of the groups are woven in directions (in the same manner as the 3-D preform described in FIG. 1) which are determined by a three dimensional Cartesian Coordinate System in which the X, Y and Z axes are disposed in mutually orthogonal directions, each axis being normal to a face of the preform 20.

The other four directions of the remaining four groups of yarns are determined by one of two methods. The first of these methods which may be referred to as the "across the corner" method is best described with reference to FIG. 2. The composite body preform cell 20a is shown with the X, Y and Z axes in which the center of origin A is for convenience disposed at the center of mass of the body. Four diagonals, T, U, V and W which represent the other four directions of the four remaining groups of yarns are shown passing from one corner of the block 20a through the center of origin to the corner which is diametrically opposed to the first corner. In other words, the direction of each of the T, U, V and W diagonals are at a 45° angle to the X and Y axes, and approximately 35° to the Z axis.

The second method for determining the four directions of the remaining four groups of yarns may be referred to as the "across the face" method and is best described with reference to FIG. 3. The composite body preform cell 20b is also shown with the mutually orthogonal X, Y, and Z axes disposed so that each axis is normal to a face of cell 20b and in which the center of origin A is for convenience shown disposed at the center of mass of the body. Two diagonals, R and P are shown disposed in the X-Z plane (the plane determined by the X and Z axes) in which the diagonals extend normal to each other and at 45° angles to the X and Z axes. Unlike the method described in FIG. 2, these two diagonals remain perpendicular to the Y axis. The other two diagonals Q and S are shown disposed in the Y-Z plane (the plane determined by the Y and Z axes) in which they extend normal to each other and at a 45° angle to the Y and Z axes and perpendicular to the X axis.

It has been found that the packing efficiency for the 7-D preform can be approximately the same as the 3-D preform. The following Table I is an example of the fiber volume fractions for a 3-D and a 7-D body.

TABLE I

| | | Directions of Reinforcement | | | | | | |
|---|---|---|---|---|---|---|---|---|
| | | T | U | V | W | X | Y | Z |
| % Fiber | 3D | | | | | 25 | 25 | 50 |
| Volume | 7D | 11.5 | 11.5 | 11.5 | 11.5 | 18 | 18 | 18 |

Although it is apparent from Table I that the 7-D composite body will not be as strong as the 3-D body in the X, Y and Z directions, since it is necessary to provide volume for the diagonal reinforcement, the 7-D composite body will be stronger in the T, U, V and W directions. Thus, the body will geometrically have more isotropic strength properties.

It will be apparent that if the resulting composite preform 20 is to be machined for example to a cylindrical or conical shape, the 7-D structure's isotropy is a definite advantage as reinforcing yarns will radiate, in addition to the 90° intervals of the 3-D structure, at 45° intervals. Since a greater number of fiber ends will be exposed on the surface of the composite body, the body will perform better under ablative conditions.

Figure 4:
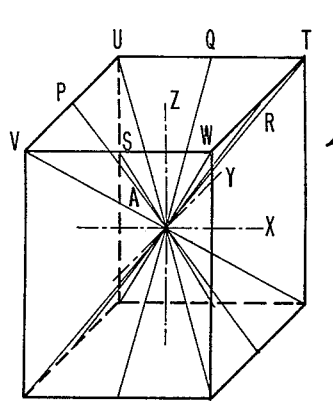
FIG. 4 is a perspective view of a geometric representation of a third embodiment of a unit cell made in accordance with the teachings of the invention.

In order to make the strength properties of the composite body even more uniform, an "11-D" reinforcing structure can be made by employing both the "across the corners" and "across the face" methods as described above to the same structure. Thus, referring to FIG. 4, the unit cell of body 30 has three of the eleven groups of yarns disposed in the direction of the X, Y and Z axes (all three axes are mutually orthogonal to each other and intersect at A). Four directions of four of the remaining eight groups of yarns are disposed in the same or parallel direction to the direction of the diagonals T, U, V and W. These diagonals are determined in accordance with the "across the corner" method described above in reference to FIG. 2. Thus, each diagonal will extend at a 45° angle to the X and Y axes, and approximately 35° to the Z axis. The last four directions of the remaining four groups of yarns are disposed in the same or parallel direction as the diagonals P, Q, R and S. These latter diagonals are determined in accordance with the "across the face" method described in reference to FIG. 3. Thus, the R and P diagonals are disposed in the X-Z plane, normal to one another as well as to the Y axis and at 45° angle to the X and Z axes. The Q and S diagonals are disposed in the Y-Z plane, normal to one another and the X axis and at a 45° angle to the Y and Z axes.

Figure 5:
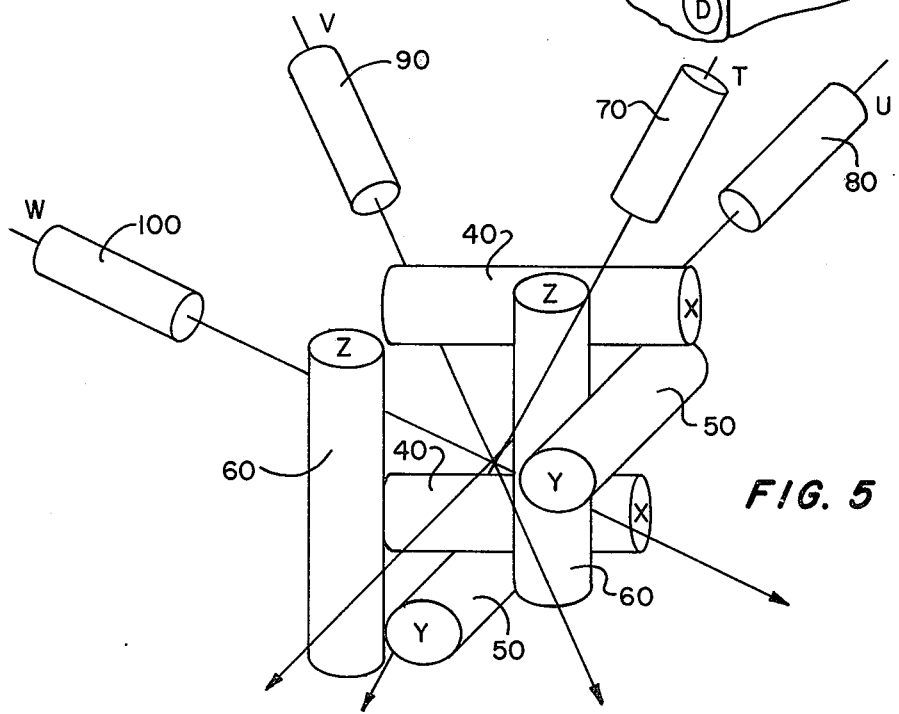
FIG. 5 is a perspective view of an embodiment of a unit cell of a reinforcing structure made in accordance with the teachings of the invention.

An example of the spatial interrelationship of a unit cell having the yarns of a 7D reinforcing structure is shown in FIG. 5. As previously described, seven groups of yarns 40, 50, 60, 70, 80 and 90 and 100 are interwoven together. The yarns of each group are woven essentially in the same direction with respect to one another. Three of the groups of yarns 40, 50 and 60 are woven in direction which are mutually orthogonal to one another. The directions of the groups of yarns 40, 50 and 60 will thus define the X, Y and Z axes, respectively. The yarns 40, 50 and 60 are thus referred to as the X, Y and Z yarns respectively. The directions of the other four groups of yarns 70, 80, 90 and 100 are shown by way of example as that prescribed by the "across the corner" method shown and described in reference to FIG. 2. Thus, the direction of the yarns 70, 80, 90 and 100 are generally in the direction of the 45° diagonals T, U, V and W, respectively. Each of the diagonals T, U, V and W are generally at a 45° angle to the X and Y yarns approximately 35° to the Z yarns. The diagonal yarns are generally interwoven in the interstices provided by the X, Y and Z yarns in a manner well known in the art.

Figure 6:
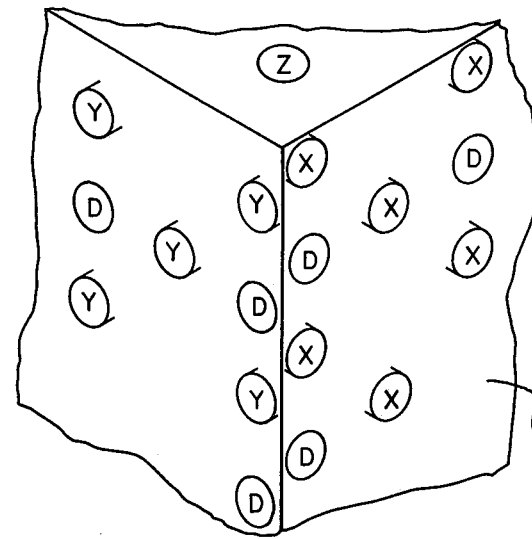
FIG. 6 is a perspective view of an embodiment of a unit cell of a composite body formed in accordance with the teachings of the invention.

Referring to FIG. 6, a 7D composite body preform 110 is shown in perspective with a reinforcing structure woven in accordance with the "across the corners" method shown and described in FIG. 3. The ends of the yarns are exposed at the surfaces of the body 110. As shown, in addition to the X, Y and Z yarns, diagonal yarns designated D are also exposed, thereby increasing the number of yarns that are exposed at the surface.

As a general rule, the volume proportion occupied by the filaments of the woven filament reinforcing structure in the composite body will depend upon the particular application. For example, when used for thermal protection (insulation), the volume proportion of yarns will be relatively low, whereas for chemical vapor deposition applications involving heat transfer from the yarns to a gas and wherein maximizing surface area for heat transfer and deposition are important factors, the volume percent of yarns is easily varied by changing the spacing between the parallel yarns of each group.

In the structures shown, by way of example, the parallel yarns may be spaced from one another by a distance equal to several diameters of the yarns. In a closely woven structure, the parallel yarns may be separated by little more than one yarn diameter.

Although the embodiments of the invention have been described with regard to a yarn reinforcing structure especially designed for high temperature applications such as chemical vapor deposition, and formed of inert materials, it should be apparent that essentially the same structure formed of other materials can have improved utility in other applications. In particular, these applications include those in which the composite body is required to be of relatively low density and is in tension or subjected to a bearing load as in the case with many thermal and acoustical insulation applications.

In other applications, a matrix in which the yarns are embedded may be formed of material which is extremely weak and brittle. For example, the matrix can be formed initially of an organic material which is thereafter carbonized by heat and/or chemical action. In this latter example, the reinforcing yarns used with the carbon matrix should be formed of a material not affected by the carbonizing process, e.g. any inorganic material such as metal, glass or the like, resistant to high temperatures and adapted to retain its initial strength and integrity.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A composite structure comprising, in combination:
a body, and
a three-dimensional array of flexible reinforcing yarns interwoven together and embedded in said body, said array comprising a plurality of at least four groups of yarns, wherein the yarns within each of said groups are disposed substantially in parallel with respect to one another, the yarns of three of said groups are disposed in a mutually orthogonal relationship, each of the remaining groups of yarns being disposed diagonally to the yarns of at least two of said three groups.

2. A composite structure in accordance with claim 1 wherein said remaining yarns comprise at least two pairs of groups of yarns, the yarns of each group of said two pairs are disposed substantially in parallel with respect to one another, the yarns of one group of a pair are disposed in a normal direction to the direction of the yarns of the other group of said pair.

3. A composite structure in accordance with claim 2 wherein said yarns of each of said pair of groups are disposed diagonally to the yarns of two of said three mutually orthogonal groups, and normally to the yarns of the third of said mutually orthogonal groups.

4. A composite structure in accordance with claim 3 wherein the yarns of each of said pairs of groups are disposed in a normal direction to yarns of a different one of said mutually orthogonal groups.

5. A composite structure in accordance with claim 4 wherein the direction of each of said pairs of groups of yarns is at an approximate 45° angle to the yarns of said two mutually orthogonal groups.

6. A composite structure in accordance with claim 2 wherein said yarns of each group of said pairs are disposed in a direction diagonally to said three mutually othogonal groups of yarns.

7. A composite structure in accordance with claim 6 wherein the direction of each of said groups of said pairs of yarns is an approximate 45° angle to the yarns of two of said three mutually orthogonal groups and an approximate 35° angle to the filaments of the other of said three mutually orthogonal groups.

8. A composite structure in accordance with claim 4 wherein said remaining yarns further comprise at least two additional pairs of groups of yarns, the yarns of each of said additional pairs of groups are disposed in a direction diagonally to said three mutually orthogonal groups of yarns.

9. A composite structure in accordance with claim 8 wherein the direction of each of said groups of said additional pairs of groups of yarns is at an approximate 45° angle to the direction of the yarns of two of said three mutually orthogonal groups and an approximate 35° angle to the yarns of the other of said three mutually orthogonal groups.

10. A composite structure as defined in claim 1 wherein each of said yarns comprises a plurality of subfilaments in contiguous relation.

11. A composite structure as defined in claim 10 wherein said subfilaments are twisted.

12. A composite structure as defined in claim 1 wherein said body is formed of an organic material unstable at an elevated temperature and said filaments are formed of a material stable at said elevated temperature.

13. A composite structure as defined in claim 12 wherein said body is formed of a carbonaceous material and said yarns are formed of noncarbonaceous material.

* * * * *